United States Patent [19]

Kataoka et al.

[11] Patent Number: 5,751,925
[45] Date of Patent: May 12, 1998

[54] IMAGE PROCESSING APPARATUS

[75] Inventors: Hiromi Kataoka, Yokohama; Shunichi Masuda, Kawasaki; Tetsuo Saito, Tokyo; Kazuma Yamamoto, Kawasaki, all of Japan

[73] Assignee: Canon Kabushiki Kaisha, Tokyo, Japan

[21] Appl. No.: 889,446

[22] Filed: Jul. 8, 1997

Related U.S. Application Data

[60] Continuation of Ser. No. 515,053, Aug. 14, 1995, abandoned, which is a division of Ser. No. 91,690, Jul. 15, 1993, Pat. No. 5,602,975.

Foreign Application Priority Data

| Jul. 22, 1992 | [JP] | Japan | 4-195111 |
| Mar. 3, 1993 | [JP] | Japan | 5-067502 |

[51] Int. Cl.⁶ ........................... G06K 15/00
[52] U.S. Cl. ........................... 395/115; 395/112
[58] Field of Search ........................... 395/101, 112, 395/115, 116, 113, 427, 433, 878, 879, 507, 514, 520, 521; 358/404, 444, 437

[56] References Cited

U.S. PATENT DOCUMENTS

| 3,582,897 | 6/1971 | Marsh | 340/172.5 |
| 4,907,094 | 3/1990 | Mishima et al. | 358/437 |
| 5,083,266 | 1/1992 | Watanabe | 395/433 |
| 5,331,580 | 7/1994 | Miller | 364/708.1 |
| 5,438,436 | 8/1995 | Harris | 358/500 |

*Primary Examiner*—Arthur G. Evans
*Attorney, Agent, or Firm*—Fitzpatrick, Cella, Harper & Scinto

[57] ABSTRACT

An image processing apparatus comprises a memory for storing image data to be formed into an image, a memory holding unit for holding the content of the memory, and a control unit for stopping the memory holding operation by memory holding unit during a stand-by period of the image forming operation.

14 Claims, 12 Drawing Sheets

IMAGE PROCESSING APPARATUS

This application is a continuation-in-part of application Ser. No. 08/515,053 filed Aug. 14, 1995 now abandoned, which was a divisional of application Ser. No. 08/091,690 filed Jul. 15, 1993 now U.S. Pat. No. 5,602,075 issued Feb. 11, 1997.

BACKGROUND OF THE INVENTION

1. Field of the Invention

The present invention relates to an image processing apparatus, and more particularly to an image processing apparatus applicable to a recording apparatus such as a laser beam printer or the like.

2. Related Background Art

A printing apparatus such as a laser beam printer comprises, as known well, a controller for generating an image of a bit map for printing out print data outputted from a host device through a host I/F, a print engine for printing the image data outputted from the controller onto a form, and a power supply for supplying a power to the controller and the print engine. Major power consumption units in the printing apparatus are an execution processing unit and a memory unit in the controller, and a fixing unit heater and a drive motor in the print engine.

In this type of printing apparatus, the power supply is turned on and off by a single power switch to the power supply which supplies power to the controller and the print engine. Namely, from the turn-on to the turn-off of the power supply, most parts of the printing apparatus are energized.

However, in a printing apparatus having a relatively low frequency of use, the time in which the printing apparatus is actually operated is short relative to the energization time of the printing apparatus. The printer may sometimes be energized over night without being actually used and the printing apparatus unduly consumes power. Further, such continuous energization leads to the shortening of electric parts having limited durability.

On the other hand, the laser beam printer has been widely used as a computer output device because of its advantages of low price and compactness. As shown in FIG. 7, the laser beam printer comprises a printer engine section 90 for printing out characters on a photoconductor drum on the basis of dot data, and a printer controller section 80 for generating page information including dot pattern data based on the code data transmitted from an external host computer 70 and for sequentially sending out the dot pattern data to the printer engine 90.

As shown in FIG. 8, the printer engine 90 comprises an engine CPU 1, a low voltage supply (low voltage source) 2, a high voltage supply (high voltage source) 3, a scanner unit 4, a fixing unit 5, a main motor 6, a fan 7 and the like. As shown in FIG. 9, the printer controller 80 comprises a controller CPU 10, a RAM (DRAM) 30, a ROM 31, a memory I/O control section 32, a panel I/F control section 33, a host I/F control section 34, a console panel (operation panel) 35 and the like. A power supply voltage (e.g., +5 volts) necessary for the operation of the semiconductors of those sections is supplied from the printer engine 90. The engine CPU 1 of the printer engine 90 and the controller CPU 10 of the printer controller 80 always communicate to each other so that a status is transmitted from the printer engine 90 and a command is transmitted from the printer controller 80.

The controller CPU 10 receives the code data outputted from the host computer 70 through the host I/F control section 34, generates bit map image data based on the code data, and develops it on the RAM (DRAM) 30. When the code data includes text characters, font data corresponding to the text characters is read from a character generator (CG) formed on the ROM 31 to generate the bit map image data. When the generation of one page of bit map image data is completed, the controller CPU 10 requests the start of printing to the printer engine 90 and thereafter starts the printing by a vertical synchronization signal outputted from the printer engine 90.

In this case, the bit map image data developed on the RAM 30 is outputted to the printer engine 90 line by line in synchronism with the horizontal synchronization signal from the printer engine 90. The printer engine 90 generates various control signals based on the bit map image data to drive the scanner unit 4, the fixing unit 5, the motor 6 and the fan 7 and drive the laser beam sent from the printer controller 80 to print out the data.

In the prior art laser beam printer, since the RAM 30 in the printer controller 80 is usually a DRAM, it must be always refreshed in spite of the fact that it mainly reads and writes the data required in the printing. Further, the console panel 35 which is constructed by a liquid crystal touch panel (display panel) must always be illuminated. Further, since both the engine CPU 1 and the controller CPU 10 are clocked at a frequency close to a maximum processing speed of the CPU because a crystal oscillator (not shown) for generating the clock is designed by taking the highest speed condition into account. As a result, a large current is required during the printing as well as the stand-by.

When an end user uses the printing apparatus, there is a trend that the user dislikes the trouble for turning off the switch after the use. It is not rare that the stand-by status (stand-by for the image forming operation) occupies about 99% of the power-on period and the image formation operation occupies only the remaining 1%, depending on the manner of use of the apparatus. This causes a large amount of waste of power in the prior art laser beam printer. A similar problem occurs not only in the laser beam printer, but also in other image forming apparatus such as a conventional printer or the like.

SUMMARY OF THE INVENTION

It is an object of the present invention to solve the above problems.

It is another object of the present invention to provide an image processing apparatus which reduces power consumption of the printing apparatus by deactivating the apparatus except a host I/F control section when data communication with a host apparatus lasts for longer than a predetermined time during a non-print period.

In order to solve the above problems and achieve the above objects, the image processing apparatus of the present invention connected to the host apparatus and having image processing means for processing the image in accordance with the image data received from the host apparatus comprises communication control means for controlling the communication with the host apparatus, discrimination means for determining the presence or absence of the reception from the host apparatus, power control means for continuing the supply of power to the communication means and stopping the supply of the power to the image processing means when the absence of the reception is determined by the discrimination means, and power recovery means for recovering the supply of the power to the image processing means when the presence of the reception is determined by the discrimination means.

In the present configuration, the communication control means controls the communication with the host apparatus, the discrimination means determines the presence or absence of the reception from the host apparatus. the power control means continues to supply the power to the communication control means and stops to supply the power to the image processing means when the absence of the reception is determined by the discrimination means, and the power recovery means recovers the supply of the power to the image processing means when the presence of the reception is determined by the discrimination means.

It is another object of the present invention to provide an image forming apparatus which can suppress power consumption.

In accordance with another aspect of the present invention, the image forming apparatus comprises memory means for storing image data to be formed into an image, memory holding means for holding the memory of the memory means, and stop control means for stopping the memory holding operation by the memory holding means during a stand-by period of the image forming operation.

The memory means stores the image data to be formed into the image and the memory holding means stores the memory holding operation of the memory means. The stop control means stops the memory holding operation by the memory holding means during the stand-by period of the image forming operation to suppress the power consumption.

In accordance with the aspect of the present invention, the image forming apparatus comprises central processing means for controlling image formation processes, clock supply means for supplying a basic clock of an operation timing of the central processing means to the central processing means, and command means for commanding the clock supply means to supply a basic clock having a low frequency during the stand-by period of the image formation operation.

The central processing means controls various image formation processes, the clock supply means supplies the basic clock of the operation timing of the central processing means to the central processing means, and the command means commands the clock supply means to supply the basic clock having the low frequency during the stand-by period of the image formation operation to suppress the power consumption.

In accordance with another aspect of the present invention, the image forming apparatus comprises a switching power supply for supplying a power by turning on and off a primary input voltage of an output power supply, and first switching control means for switching the switching control by the switching power supply from pulse width modulation control to frequency modulation control during the stand-by period of the image formation operation.

The switching power supply supplies the power by turning on and off the primary input voltage of the output power supply, and the first switching control means switches the switching control by the switching power supply from the pulse width modulation control to the frequency modulation control during the stand-by period of the image formation operation to suppress the power consumption.

In accordance with another aspect of the resent invention, the image forming apparatus comprises a switching power supply for supplying a power by turning on and off a primary input voltage of an output power supply, and second switching control means for switching the output voltage of the switching power supply from a high voltage to a low voltage during the stand-by period of the image formation operation.

The switching power supply supplies the power by turning on and off the primary input voltage of the output power supply, and the second switching control means switches the output voltage of the switching power supply from the high voltage to the low voltage during the stand-by of the image formation operation to suppress the power consumption.

In accordance with another aspect of the present invention, the stop control means, the command means, the first switching control means or the second switching control means include count means for counting the stand-by period of the image formation operation so that the those means are activated when the stand-by time counted by the count means exceeds a predetermined time.

The stop control means, the command means, the first switching control means or the second switching control means includes the count means for counting the stand-by time of the image formation operation and those means are activated when the stand-by time counted by the count means exceeds the predetermined time so that the power consumption is suppressed.

In accordance with another aspect of the present invention, the image forming apparatus comprises detection means for previously detecting the start of the image formation operation, and first recovery control means for releasing the function of the stop control means, the command means, the first switching control means or the second switching control means in response to the detection by the detection means to recover the initial state.

The detection means previously detects the start of the image formation operation by detecting the manipulation of the console panel, for example. The first recovery means releases the function of the stop control means, the command means, the first switching control means or the second switching control means in response to the detection by the detection means to recover the initial state.

In accordance with another aspect of the present invention, the image forming apparatus comprises receiving means for receiving from an external equipment a command for releasing the state formed by the operation of the stop control means, the command means, the first switching control means or the second switching control means, and second recovery control means for releasing the state formed by the stop control means, the command means, the first switching control means or the second switching control means in response to the reception of the command by the receiving means to recover the initial state.

The receiving means receives the command to release the state formed by the stop control means, the command means, the first switching means or the second switching means. The second recovery means releases the state formed by the operation of the stop control means, the command means, the first switching control means or the second switching control means to recover the initial state.

DETAILED DESCRIPTION OF THE PREFERRED EMBODIMENTS

Figure 7:
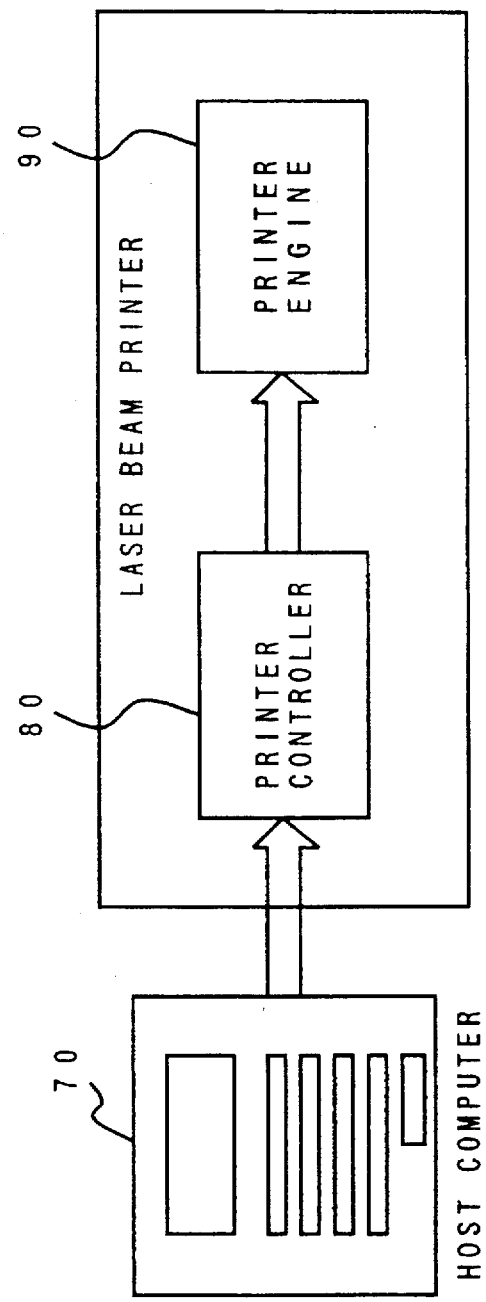
FIG. 7 shows a system configuration of a laser beam printer in a prior art apparatus and an embodiment of the present invention.

The preferred embodiments of the present invention are now explained with reference to the accompanying drawings. Basic configurations of first to third embodiments are substantially identical to FIGS. 7–9 explained in connection with the prior art apparatus and differences therefrom are mainly explained.

<First Embodiment>

Figure 1:
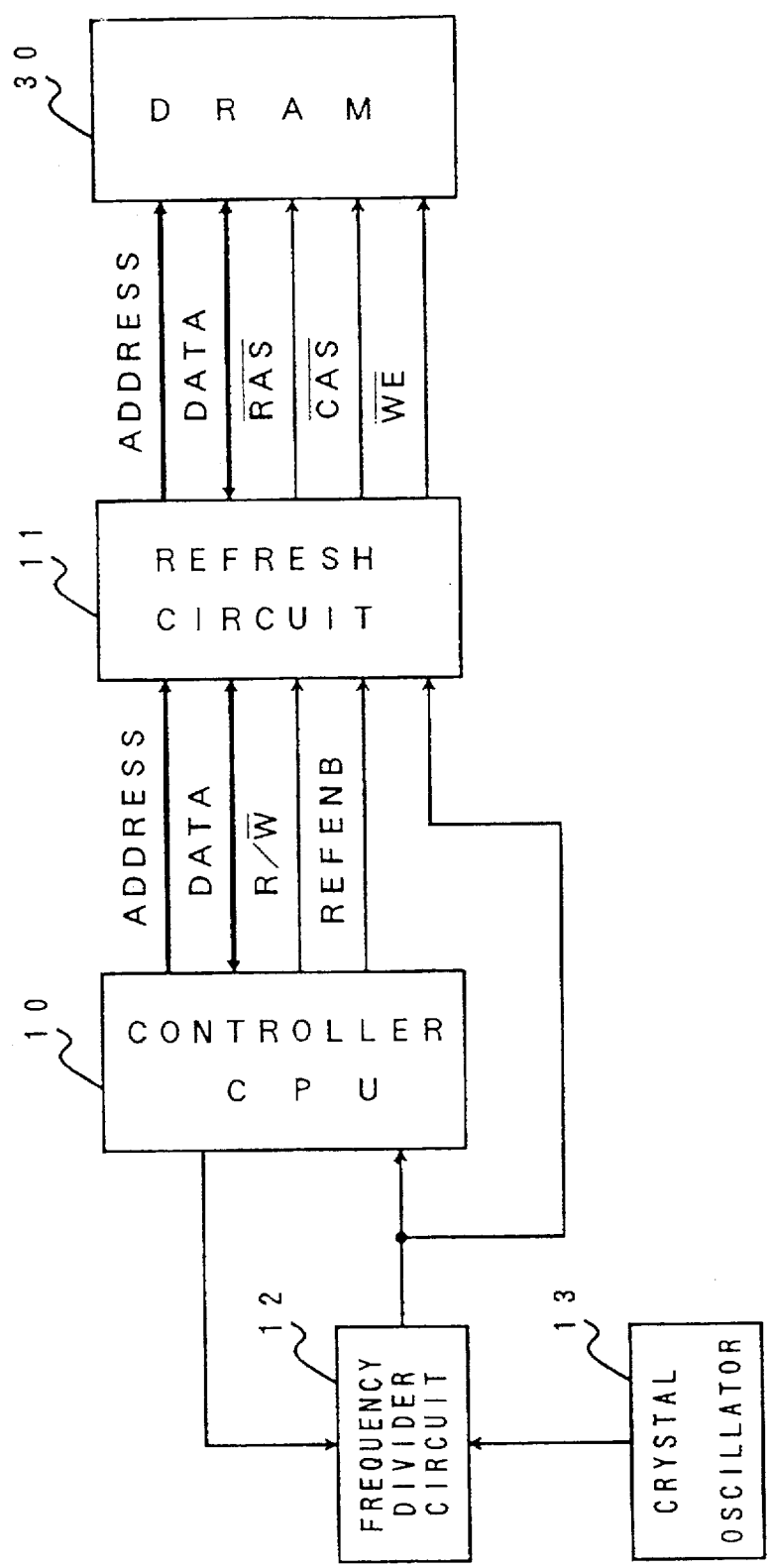
FIG. 1 shows a block diagram of a configuration of a periphery of a refresh circuit in an embodiment of the present invention.
Figure 8:
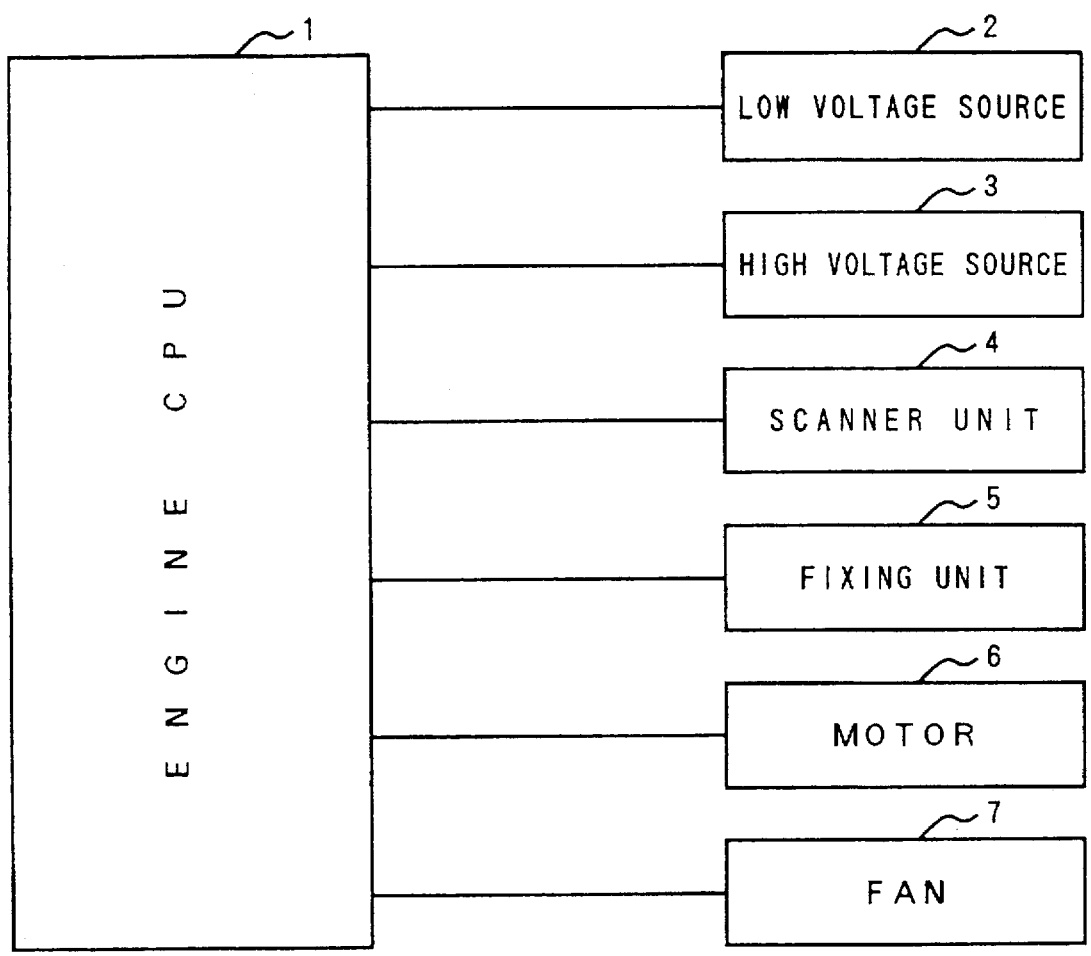
FIG. 8 shows a block diagram of a printer engine in the prior art apparatus and the embodiment of the present invention.
Figure 9:
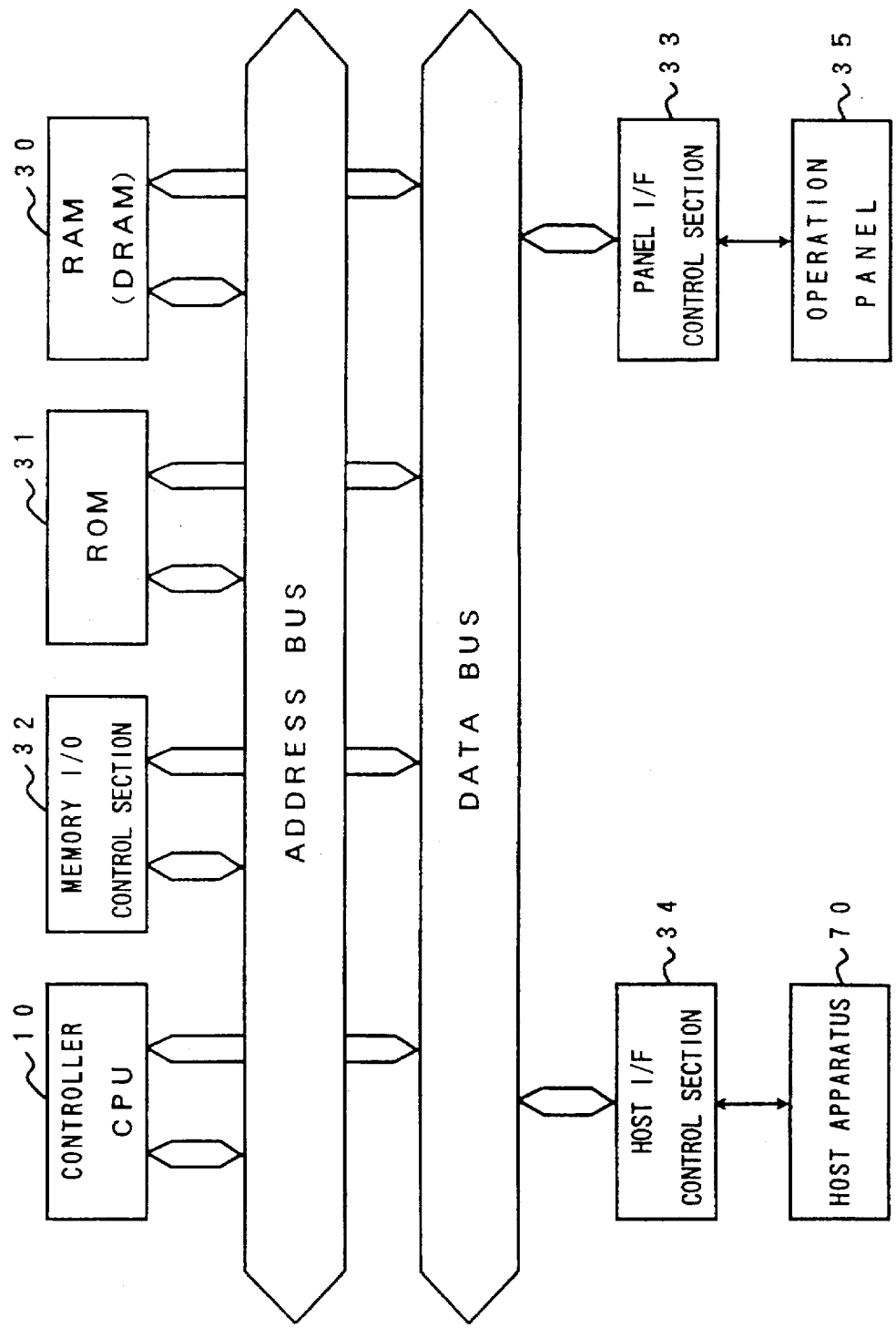
FIG. 9 shows a block diagram of a printer controller in the prior art apparatus and the embodiment of the present invention.

FIG. 1 shows a block diagram between the controller CPU 10 and the DRAM 30 of FIG. 8. The refresh circuit 11 which is provided in the prior art apparatus as well is omitted in FIG. 8. The functions of the controller CPU 10 and the refresh circuit 11 are different from those of the prior art apparatus.

The refresh circuit 11 is provided between the controller CPU 10 and the DRAM 30 and it multiplexes the address from the controller CPU 10 to output it as an access address to the DRAM 30 and it has a timer and conducts the refreshing of the DRAM 30 and the arbitration between the read/write instruction by an R/W signal from the controller CPU 10 and the refresh.

REFENB applied from the controller CPU 10 to the refresh circuit 11 is a refresh enable signal which is normally true but it is rendered false in a sleep mode. When the refresh enable signal REFENB is rendered false, the refresh operation of the refresh circuit 11 is stopped and the data in the DRAM 30 is extinguished in several milliseconds but this is not a problem because the controller CPU 10 does not render the refresh enable signal REFENB during the development of the image. Thereafter, the controller CPU 10 outputs a select signal to a frequency divider circuit 12 which frequency-divides an oscillation frequency from a crystal oscillator 13 to increase a frequency division factor so that a clock signal CLK which is normally at a maximum speed (for example, 32 MHz) to a low speed (for example, 100 KHz). As a result, the controller CPU 10 is operated at the low speed.

In this manner, the refresh operation is enabled only during the development period of the image data to the DRAM 30 and the refresh operation is inhibited during other period. Further, during the period in which the refresh operation is not conducted, the controller CPU 40 is operated at the low speed to prevent the waste of the power.

Figure 2:
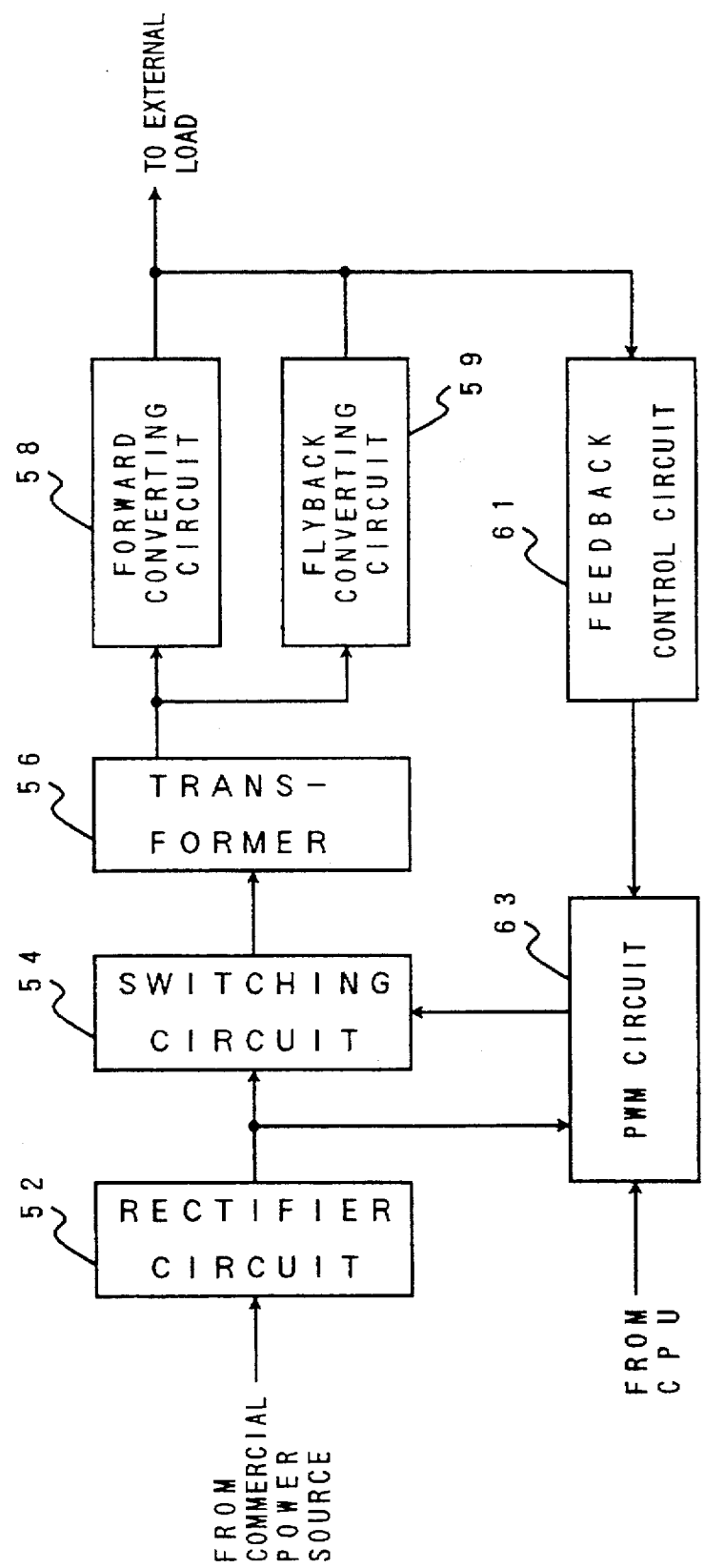
FIG. 2 shows a block diagram of a configuration of a low voltage supply in a first embodiment of the present invention.

FIG. 2 shows a circuit diagram of a low voltage supply in FIG. 8 of the present laser beam printer (image forming apparatus). An AC voltage (for example, 100 volts) supplied from a commercial power line (commercial power source) is converted to a DC voltage by a filter circuit, a rectifying circuit and a smoothing circuit in a rectifier circuit 52 and it is outputted to a switching circuit 54 and a PWM (pulse width modulation) circuit 63.

The switching circuit 54 controls the switching of the DC voltage by the switching signal from the PWM circuit 63 in accordance with the switching frequency or the switching duty and outputs it to a transformer 56, which stores or discharges energy in accordance with the switching of the DC voltage. Namely, the low voltage supply is a switching power supply which supplies a power by turning on and off the primary input voltage of the transformer 56.

A forward convert circuit 58 and a flyback convert circuit 59 store or filter the output from the transformer 56 and supply it to an external load. A feedback control circuit 61 monitors the outputs of the forward convert circuit 58 and the flyback convert circuit 59 and outputs them to the PWM circuit 63, which controls the switching frequency or the duty factor in accordance with the monitor value.

In general, in the switching duty control (pulse width modulation control) at a fixed frequency by the forward convert circuit 58, a loss of the switching element (for example, a power MOS) is constant without regard to the load current. On the other hand, in the switching duty control (frequency modulation control) at a fixed duty factor and a fixed frequency by the flyback convert circuit 59, the larger the load current is, the larger is the loss of the circuit element and the lower is the efficiency. Thus, the switching control is switched by the switching signal from the control CPU 10 so that the switching control is conducted by the forward convert circuit in the normal operation mode in which the load current is large and by the flyback convert circuit 59 in the sleep mode in which the load current is small. Namely, in the normal operation mode, the pulse width modulation control is conducted, and in the sleep mode, the frequency modulation control is conducted.

Figure 3:
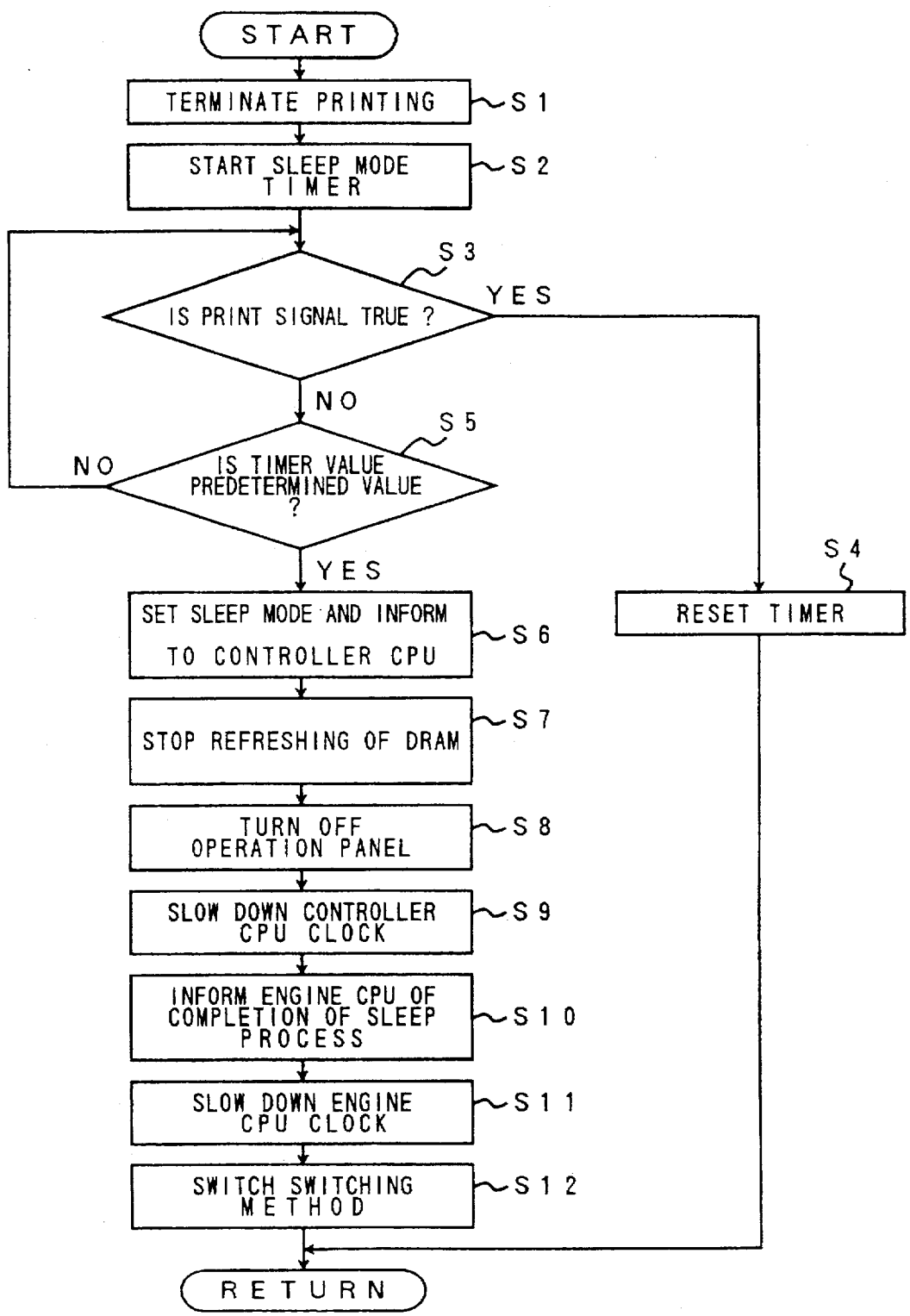
FIG. 3 shows a flow chart of a power saving operation in the first embodiment of the present invention.
Figure 4:
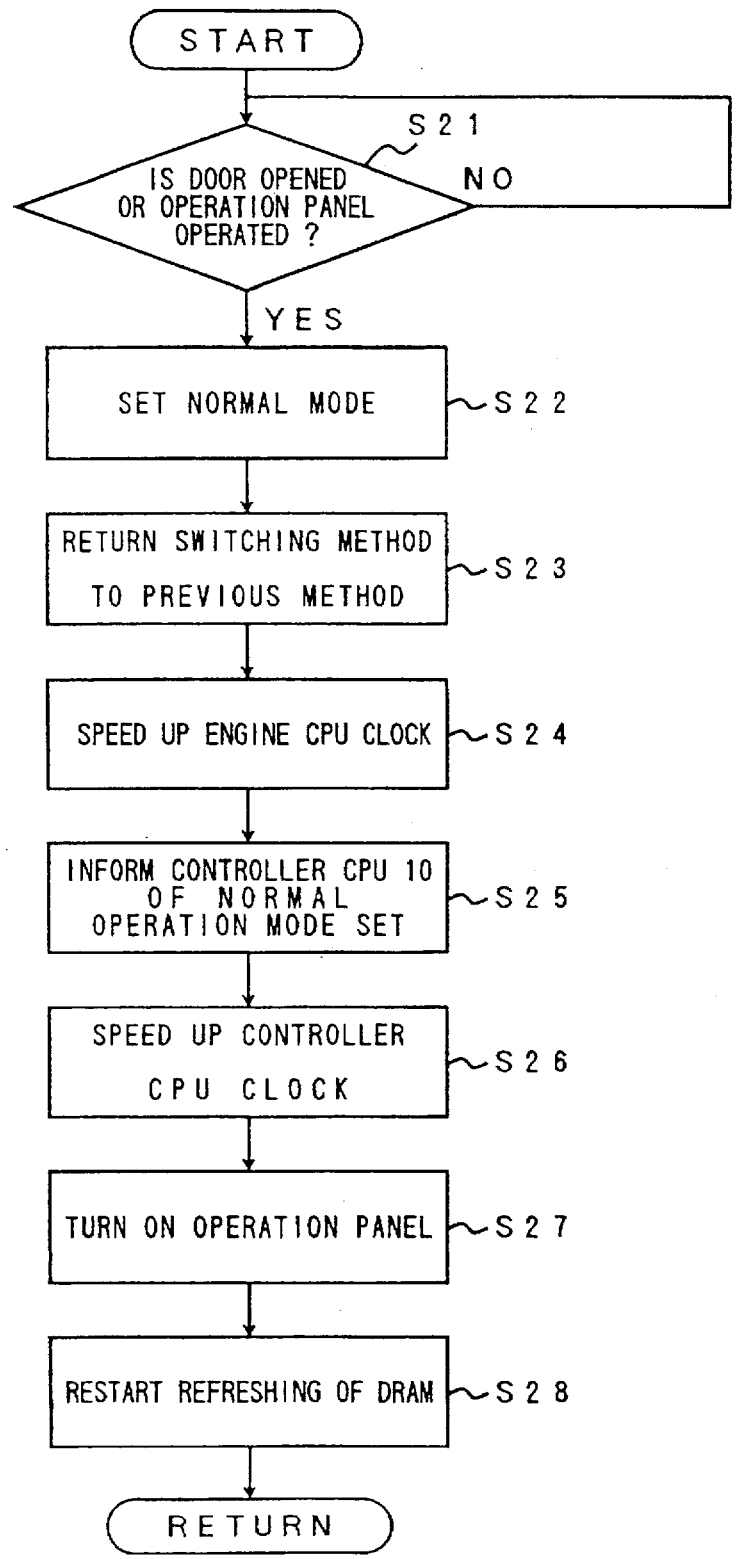
FIG. 4 shows a flow chart of a recovery process to a normal operation state in the first embodiment of the present invention.

An operation inherent to the first embodiment is explained with reference to flow charts of FIGS. 3 and 4. The function of this operation is built in firmware of the engine CPU 1.

When a user completes the printing, the engine CPU 1 detects the end of print (step S1 in FIG. 3) and starts the sleep mode timer (step S2). Then, the engine CPU 1 monitors the print signal sent from the controller to determine whether or not the print signal is rendered true to detect whether the user has thereafter conducted a new print operation or not (step S3). If the print signal is rendered true, it resets the sleep timer (step S4) and the process returns to a main routine.

On the other hand, if the print signal is false, the count of the sleep mode timer, that is, the elapse time of the non-print state (the stand-by state of the image formation operation) from the end of the previous printing is compared with a predetermined value (for example, 30 minutes) (step S5), and if the elapsed time of the non-print state is smaller than the predetermined value, the process returns to the step S3 to monitor the print signal. On the other hand, if the non-print state lasts for longer than the predetermined period, the engine CPU 1 determines that the printer is not in use, sets the sleep mode and informs it to the controller CPU 10 (step S6).

Then, the controller CPU 10 stops the refreshing of the DRAM 30 (step S7). Then, the console panel is turned off (step S8) and the microcomputer clock CLK of the controller CPU 10 is lowered (step S9). The completion of the sleep process is informed to the engine CPU 1 (step S10).

Then, the engine CPU 1 lowers the microcomputer clock CLK as the controller CPU 10 did (step S11). Since the power load is reduced by the stop of the refreshing of the DRAM 30, the turn-off of the console panel 35 and the speed reduction of the microcomputer clock CLK of the engine CPU 1 and the controller CPU 10, the engine CPU 1 switches the convert circuit in the low voltage switching power supply circuit of FIG. 2 from the forward convert circuit 58 to the flyback convert circuit 59 so as to enhance the efficiency of the power supply (step S12) and the process returns to the main flow.

In this manner, when the printer is not used over the predetermined period and stands by the print operation, the power load is reduced and the convert method of the switching power supply is switched so that the loss of the switching element is minimized, the efficiency of the power supply is enhanced and the power is saved.

A recovery process from the sleep mode to the normal mode is explained with reference to the flow chart of FIG. 4.

In the sleep mode, the engine CPU 1 sets the normal mode (step S22) when a door is opened or the console panel is manipulated (step S21). The engine CPU 1 switches the convert circuit of the low voltage switching power supply circuit of FIG. 2 from the flyback convert circuit 59 to the forward convert circuit 58 (step S23) and switches the microcomputer clock CLK of the engine CPU 1 to the initial high speed (step S24). The engine CPU 1 informs to the controller CPU 10 of the setting to the normal mode (step S25).

Then, the controller CPU 10 switches the microcomputer clock CLK of the controller CPU 10 to the initial high speed (step S26), turns on the console panel 35 (step S27), and resumes the refreshing of the DRAM 30 (step S28), and the process returns to the main flow. To return from the sleep mode, an infrared ray sensor may be provided on an outer case of the printer and an infrared ray emitted from a body of a user when the user approaches the printer may be detected to conduct the recovery.

<Second Embodiment>

In the first embodiment, the convert method of the switching power supply is switched to minimize the loss of the switching element and enhance the efficiency of the power supply to save the power. In the second embodiment, the convert method is fixed to the forward convert method and the switching duty is varied to reduce the output voltage to save the power.

Figure 5:
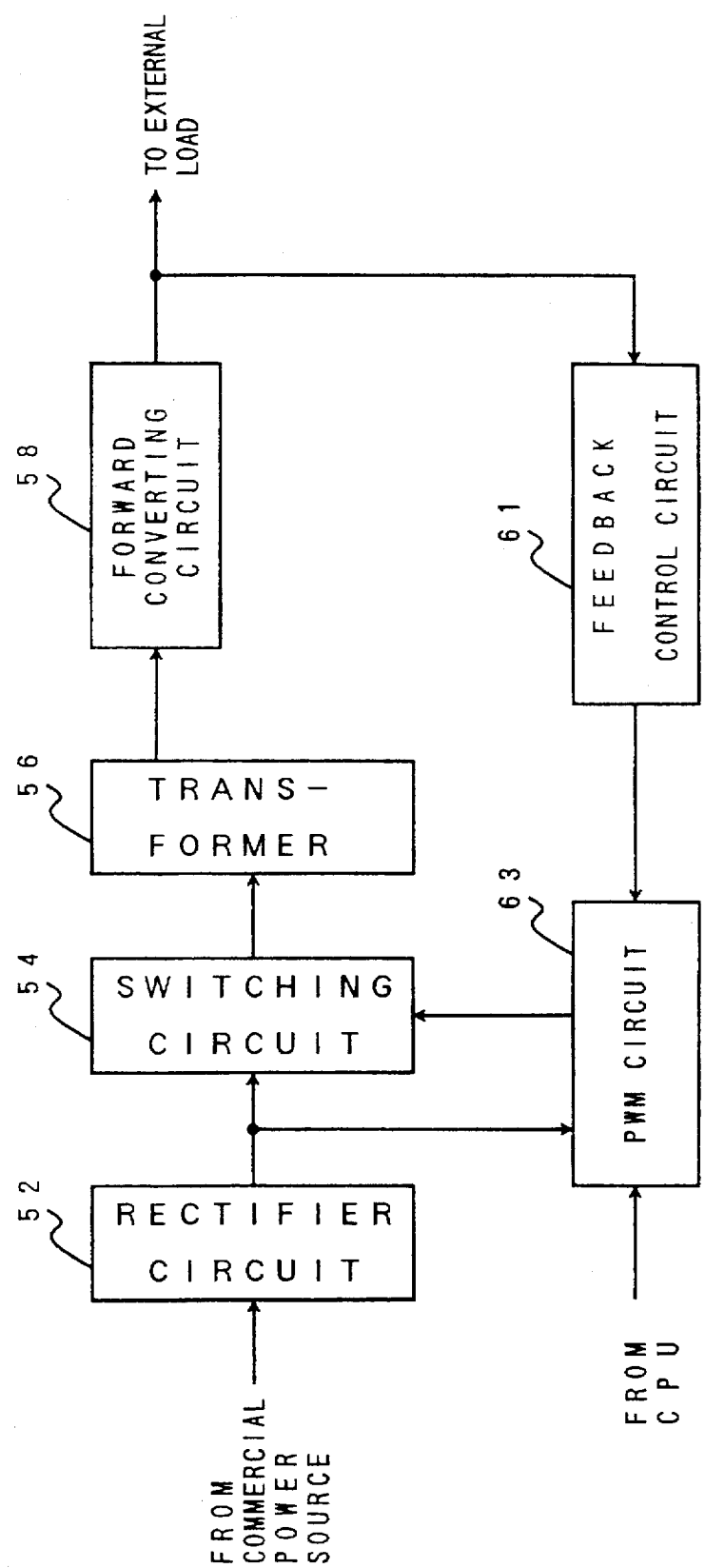
FIG. 5 shows a block diagram of a configuration of a construction of a low voltage supply in a second embodiment of the present invention.

As shown in FIG. 5, the switching power supply circuit of the second embodiment has only the forward convert circuit 58 as the convert circuit and it does not have the flyback convert circuit 59 used in the first embodiment.

The power supply voltage outputted from the forward convert circuit 58 is supplied to the semiconductor circuits in the printer engine 90 and the printer controller 80, and it is +5 volts in the operation mode other than the sleep mode. As explained in the first embodiment, if the non-print state lasts for the predetermined period, the individual devices are switched to reduce the current consumption. Then, the controller CPU 10 outputs a command signal to the PWM circuit 63 to reduce the switching duty.

Since the output voltage in the switching power supply of the forward convert type is proportional to the on-time of the switching, the PWM circuit 36 controls the switching duty to the rendered to 3/5. Namely, the PWM circuit 36 controls it such that the power supply voltage outputted from the forward convert circuit 58 is 3/5 of the normal operation mode, that is, +3 volts.

It is assumed that the semiconductor circuits in the printer engine 90 and the printer controller 80 are MOS transistors. Since the operation frequency thereof has been reduced, they are operable at +3 volts. In this manner, the power consumption can be reduced by lowering the output voltage in the switching power supply.

<Third Embodiment>

Figure 6:
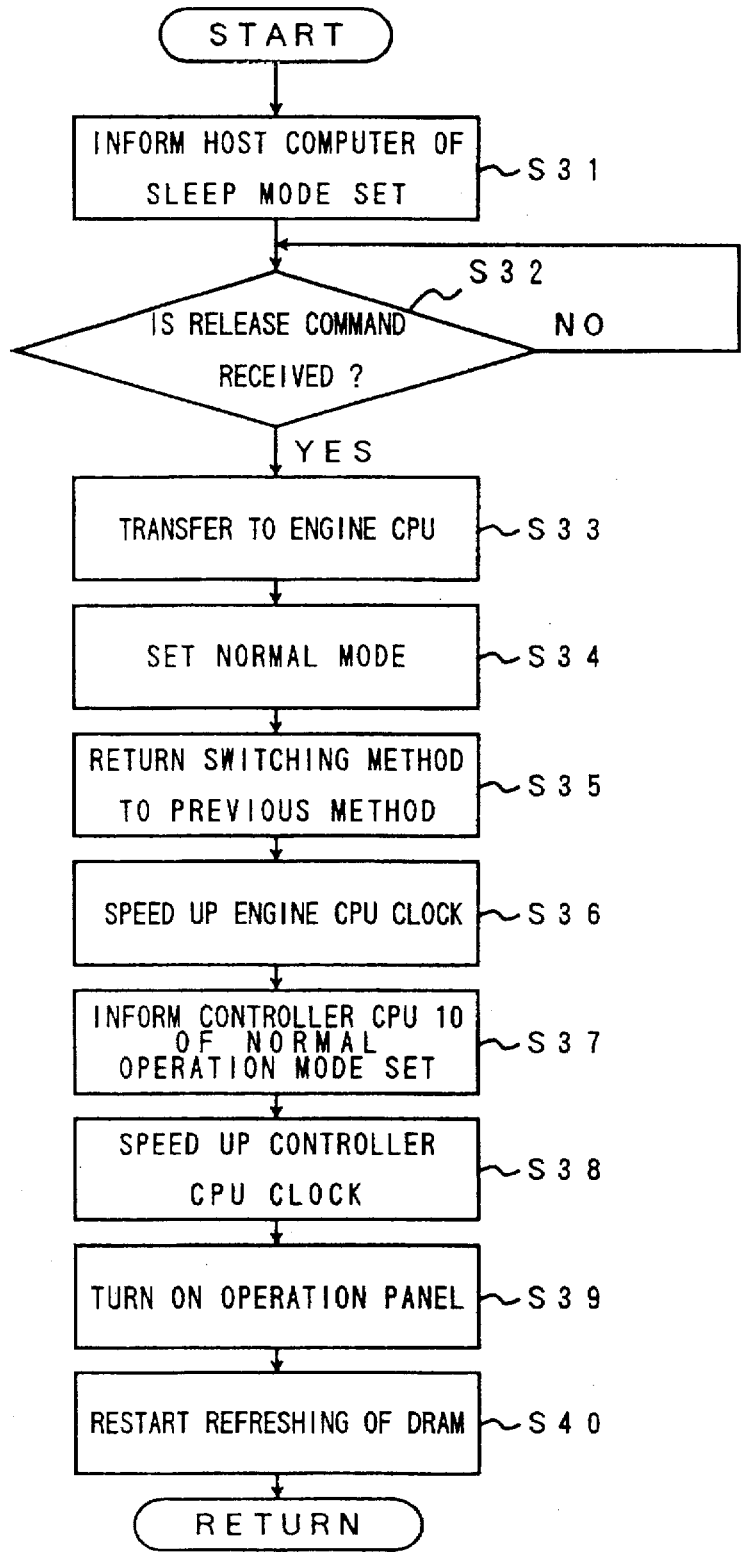
FIG. 6 shows a flow chart of a recovery process to a normal operation state in a third embodiment of the present invention.

A third embodiment is now explained with reference to a low chart of FIG. 6. In the first embodiment, the recovery from the sleep mode to the normal mode is done by the opening of the door or the manipulation of the console panel but in the third embodiment, it is done by a command from the host computer 70.

Namely, when the sleep mode is set, the printer controller 80 (controller CPU 10) of the laser beam printer informs it to the host computer 70 (step S31). The controller CPU 10 monitors a release command of the sleep mode from the host computer 70 and waits for the reception of the sleep mode release command (step S32).

When the sleep mode release command is received, the release command is transferred to the engine CPU 1 of the printer engine 90 (step S33). Thereafter, the same process as that of the steps S22–S28 of FIG. 4 in the first embodiment is conducted in steps S34–S40 and the process returns to the main flow.

The present invention is not limited to the first to third embodiments but it is equally applicable to other image forming apparatus than the laser beam printer such as a printer or a copying machine. As a trigger to recover from the sleep mode to the normal mode, an infrared ray sensor may be provided on an outer case of the printer to sense an infrared ray emitted from a body of a user when the user approaches the printer. Further, the mode may be switched to the sleep mode immediately after the end of the printing without detecting the lasting time of the non-print state.

In the first to third embodiments, the refreshing of the DRAM is stopped, the console panel is turned off, the clocks of the microcomputers of the CPU's are lowered and the switching method of the switching power supply is switched during the non-print state (during the stand-by for the image formation operation) to suppress the waste of the power.

<Fourth Embodiment>

Figure 10:
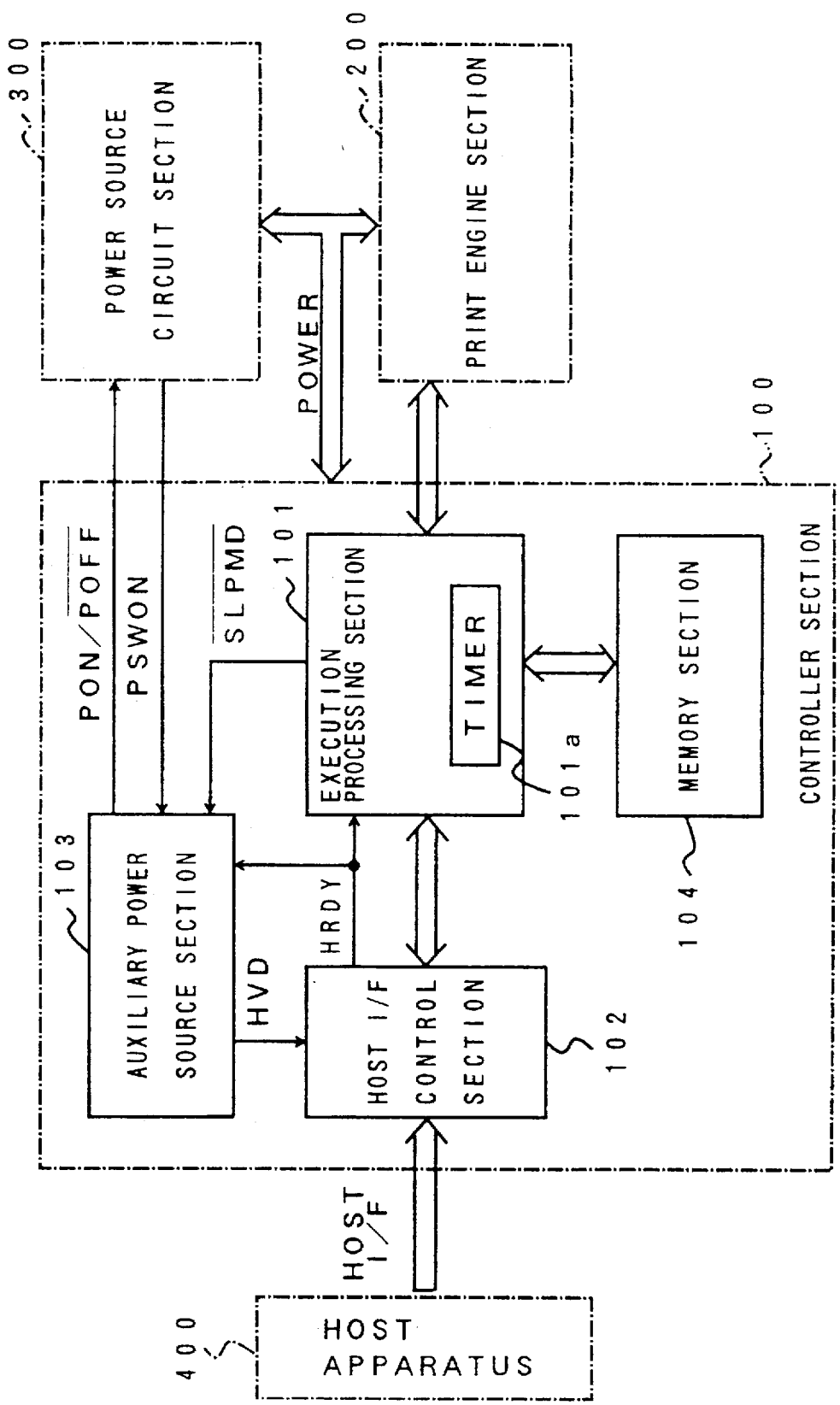
FIG. 10 shows a block diagram of a configuration of a printing apparatus in a fourth embodiment of the present invention.

FIG. 10 shows a block diagram of a configuration of a printing apparatus in accordance with a fourth embodiment of the present invention. In FIG. 10, numeral 100 denotes a controller for generating (bit map) image data to be outputted to a print engine section 200 from print data outputted from a host apparatus 400 and received through a host I/F, numeral 200 denotes the print engine section having a print mechanism and a print control unit for printing out the image data outputted from the controller 100, numeral 300 denotes a power supply circuit section for supplying a power required to operate the controller 100 and the print engine 200, and numeral 400 denotes the host apparatus. Numeral 101 denotes an execution processing section for controlling the operation of the controller 100, generating the image data and controlling the communication with the print engine 200 and the host apparatus 400, numeral 101a denotes a timer for measuring a time required for the operation of tasks in the execution processing section 101, numeral 102 denotes a host I/F control section provided between the host I/F connected to the host apparatus 400 and the execution processing section 101 to electrically conduct the data communication with the host apparatus, numeral 103 denotes an auxiliary power supply (auxiliary power source) for auxiliarily supplying a power to the host I/F control section 102 during the deactivation period of the controller 100, and numeral 104 denotes a memory section comprising a RAM for providing work areas necessary for the operation of the execution processing section 101 and for storing the image data and a ROM for storing an execution program of the execution processing section 101 and the font data of the text characters.

In FIG. 10, when the host I/F control section 102 receives the print data outputted from the host apparatus 400, it outputs a signal HRDY to the execution processing section 101 and the auxiliary power supply 103, and in response to the reception of the signal HRDY, the execution processing section 101 receives the print data received by the host I/F control section 102 to generate the image data. After the execution processing section 101 has generated one page of image data based on the print data from the host apparatus 400 or after it has outputted the image data to the printer engine 200, it monitors the communication status with the host apparatus 400 by the timer 101a, and if there is no output of the print data from the host apparatus 400 for more than a predetermined time t, that is, if the signal HRDY is not outputted from the host I/F control section 102 for more than the time t, the execution processing section 101 render the operation mode to idle (stand-by state) and outputs a command signal SLPMD for switching to the deactivation state (sleep mode) to the auxiliary power supply 103. When the SLPMD is outputted, the auxiliary power supply 103 supplies the power to the host I/F control section 102 by itself instead of the supply of the power from the power supply circuit 300 and then renders PON/POFF to a low level and outputs it to the power supply circuit 300. When the PON/POFF is high, the power supply circuit 300 supplies the power to the controller 100 and the print engine 200, and when the PON/POFF is low, it does not supply the power. The power supply circuit 300 outputs a signal PSWON indicating the ON/OFF state of the power supply to the auxiliary power supply 103.

On the other hand, when the mode is switched to the deactivation state, only the host I/F control section 102 is active by the supply of the power from the auxiliary power supply 103. Under this condition, when the host I/F control unit 102 receives the print data outputted from the host apparatus 400 and outputs the HRDY, the auxiliary power supply 103 renders the PON/POFF to the high level so that the power supply circuit 300 resumes the supply of the power to the controller 100 and the print engine 200.

Figure 11:
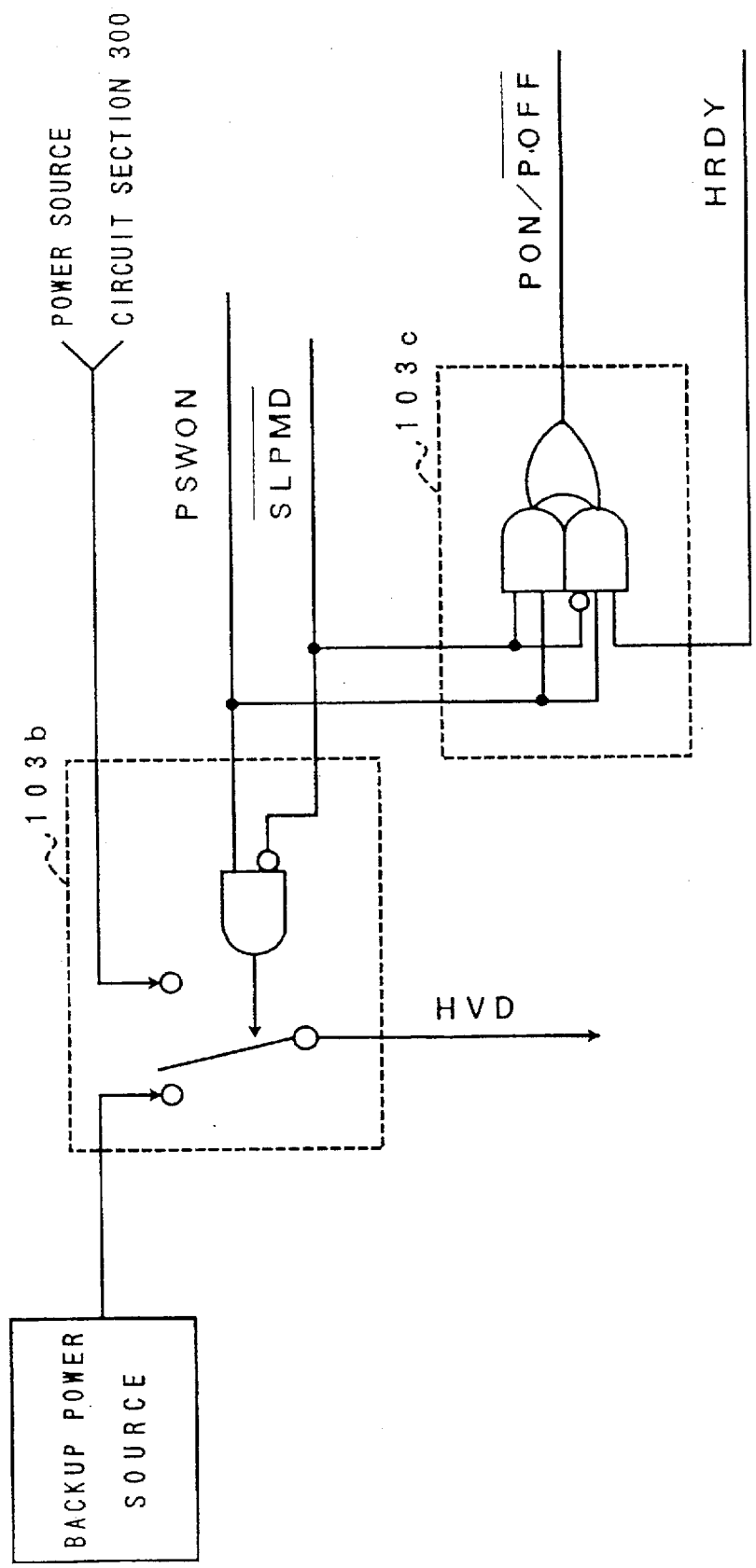
FIG. 11 shows a configuration of an auxiliary power supply.

FIG. 11 shows an internal configuration of the auxiliary power supply 103. The auxiliary power supply 103 comprises a backup power supply (backup power source) 103a for supplying a power to the host I/F control section 102 in the deactivation state, a power supply selector 103b for selecting one of the power supply from the backup power supply and the power supply from the power supply circuit 300, and a power supply command section 103c for commanding the supply of the power to the power supply circuit 300. The power supply selector 103b receives PSWON and SLPMD and when the power switch is in the ON position (PSWON=high) and the mode is deactivation state (SLPMD=low), it selects the backup power supply 103a, and when the mode is activation state (SLPMD=high) and the power switch is in the OFF position (PSWON=low), it selects the power supply circuit 300. The power supply command section 103c renders the PON/POFF to the high level when the HRDY is high in the activation state (SLPMD=high, PSWON=high) and the deactivation state (SLPMD=low, PSWON=high).

In the fourth embodiment, if the data communication between the host apparatus and the printing apparatus is not made for more than the predetermined time in the non-print period, the power supply to the controller and the print engine except the host I/F control section is stopped to render them non-active to minimize the waste of power in the printing apparatus.

<Fifth Embodiment>

A fifth embodiment of the present invention is now explained.

Figure 12:
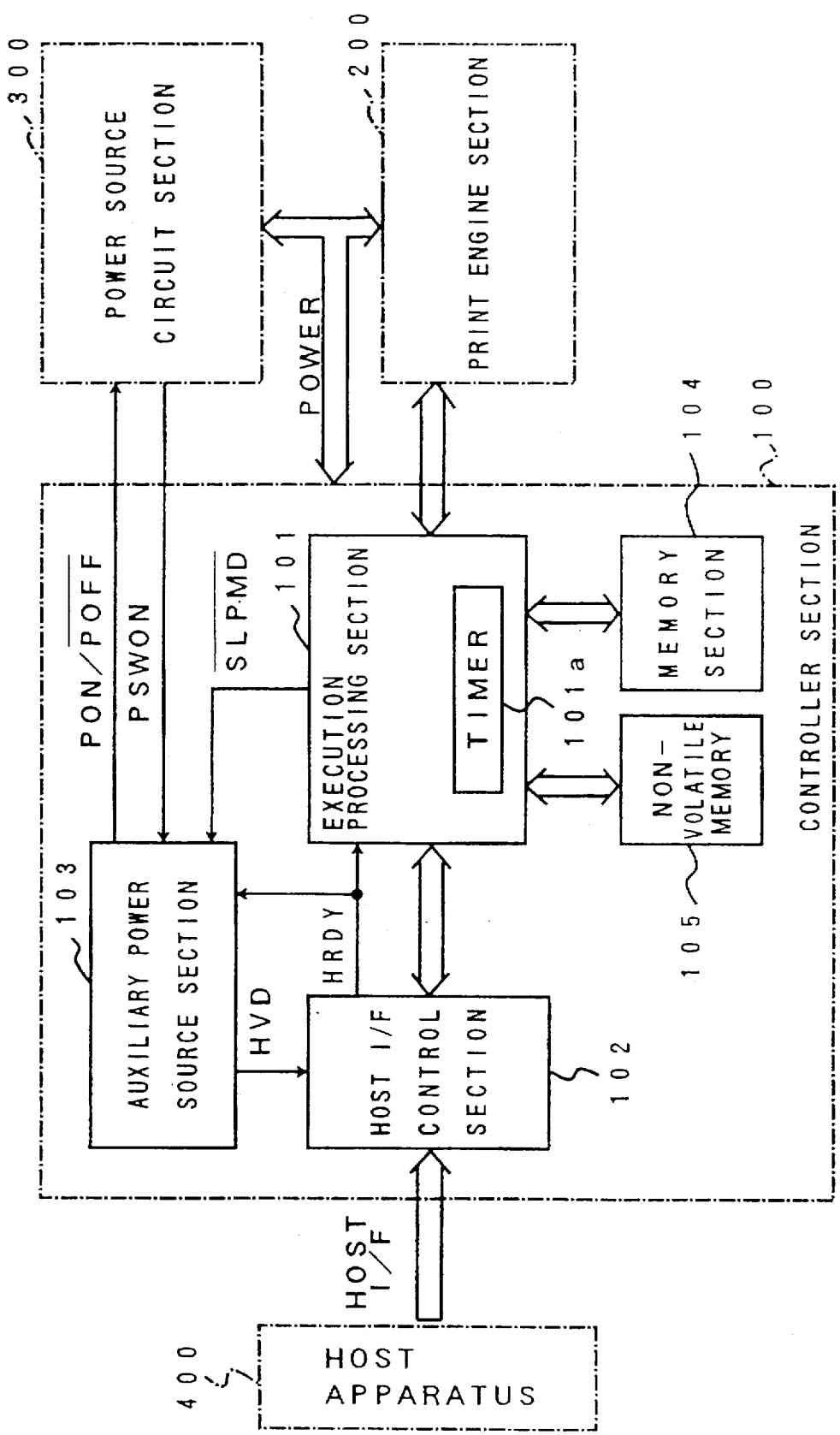
FIG. 12 shows a block diagram of a configuration of a printing apparatus in a fifth embodiment of the present invention.

FIG. 12 shows a block diagram of a configuration of a printing apparatus in accordance with the fifth embodiment of the present invention. In FIG. 12, when the HRDY is not outputted from the host I/F control section 102 (no communications is made) for more than the predetermined time t, the execution processing section 101 stores a parameter indicating the communication mode of the host I/F control section 102 in a non-volatile memory 105 formed by an EEPROM and the like and then outputs the SLPMD to the auxiliary power supply 103 and switches the mode to the deactivation state. In the deactivation state, when the host I/F control section 102 receives the print data from the host apparatus 400 and outputs the HRDY to switch the controller 100 and the print engine 200 to the activation state, the execution processing section 101 reads out the parameter indicating the communication mode in the host I/F control section 102 assumes before the mode was switched to the deactivation state from the non-volatile memory 105 and resumes the operation.

In the fifth embodiment, the risk of overnight energization by the failure of turn-off of the power supply is eliminated and the durability of the electric parts is prolonged.

The present invention may be applied to either a system comprising a plurality of equipments or a system comprising one equipment. The present invention is also applicable to a system or apparatus combined with a program.

In accordance with the first to fifth embodiments of the present invention, the waste of the power consumption can be suppressed. By the combination of the first to fifth embodiments, the effect to reduce the power consumption is enhanced.

The present invention is not limited to the above embodiments but various modifications thereof may be made without departing from the scope of the claims.

What is claimed is:

1. An image processing apparatus having a sleep mode and at least one other mode, comprising:

a dynamic memory for storing image data to be formed into an image;

an image forming unit including a CPU for forming an image based on the image data stored in said dynamic memory;

a refreshing circuit for refreshing said dynamic memory; and control means for controlling the refreshing operation of said refreshing circuit, said control means inhibiting the refreshing operation during the sleep mode of said image processing apparatus;

wherein said CPU includes means for receiving a clock signal and is adapted to operate at a speed corresponding to frequency of the clock signa, and wherein in the sleep mode the clock signal has a low frequency.

2. An image processing apparatus according to claim 1, further comprising means for timing a time from completion of the image processing and for setting the sleep mode when the time timed by said timing means exceeds a predetermined time.

3. An image processing apparatus according to claim 1, further comprising release means for releasing the sleep mode.

4. An image processing apparatus according to claim 3, wherein said apparatus releases the sleep mode in response to a command from an external apparatus.

5. An image processing apparatus according to claim 3, wherein said apparatus releases the sleep mode in response to a manipulation of an operator.

6. An image processing apparatus according to claim 1, further comprising means for converting data sent from an external apparatus into bit map image data, wherein the bit map image data is written into said dynamic memory.

7. An image processing apparatus according to claim 6, wherein said image forming unit forms an image in accordance with the bit map image data.

8. An image processing apparatus according to claim 1, wherein said image forming unit comprises means for timing a time from a completion of printing operation and for setting the sleep mode when the time timed by said timing means exceeds a predetermined time without receiving a print request.

9. An image processing apparatus according to claim 1, further comprising means for outputting one of a plurality of clock signals having different frequencies to said receiving means of said CPU, wherein in the sleep mode, a clock signal having a low frequency is output from said outputting means to said receiving means of said CPU.

10. An image processing apparatus according to claim 9, further comprising means for informing set mode to said control means.

11. An image processing apparatus according to claim 7, wherein said control means comprises a second CPU.

12. An image processing apparatus according to claim 11, wherein said control means further comprises second outputting means for outputting one of a plurality of clock signals having different frequencies to said second CPU, said second CPU operating at a speed corresponding to a clock signal from said second outputting means, wherein in the sleep mode, a clock signal having a low frequency is output from said outputting means to said second CPU.

13. An image processing apparatus according to claim 6, wherein said image forming means comprises a printer engine for printing in electrophotographic method.

14. An image processing apparatus according to claim 6, further comprising a flyback convert circuit and a forward convert circuit, wherein the flyback convert circuit is used for power supply in the sleep mode and the forward convert circuit is used for power supply is said other mode.

* * * * *

UNITED STATES PATENT AND TRADEMARK OFFICE
CERTIFICATE OF CORRECTION

PATENT NO. : 5,751,925

DATED : May 12, 1998

INVENTORS : HIROMI KATAOKA, et al.

It is certified that error appears in the above-identified patent and that said Letters Patent is hereby corrected as shown below:

COLUMN 1

Line 3, change "continuation-in-part" to --continuation--.

COLUMN 4

Line 11, change "the those" to --those--.

COLUMN 6

Line 55, change "elapse" to --elapsed--.

COLUMN 8

Line 12, change "low" to --flow--.

COLUMN 9

Line 24, change "render" to --renders--.

UNITED STATES PATENT AND TRADEMARK OFFICE
CERTIFICATE OF CORRECTION

PATENT NO. : 5,751,925

DATED : May 12, 1998

INVENTORS : HIROMI KATAOKA, et al.

It is certified that error appears in the above-identified patent and that said Letters Patent is hereby corrected as shown below:

COLUMN 10

Line 33, change "equipments" to --equipment--.

Line 61, change "to" to --to the--; and change "signa," to --signal,--.

Signed and Sealed this

Ninth Day of March, 1999

Attest:

Q. TODD DICKINSON

Attesting Officer     Acting Commissioner of Patents and Trademarks